United States Patent
Iimura et al.

(10) Patent No.: US 11,461,547 B2
(45) Date of Patent: Oct. 4, 2022

(54) NON-TRANSITORY COMPUTER READABLE MEDIUM FOR GENERATING A TARGET PROGRAM SOURCE USING SOFTWARE SPECIFICATION WRITTEN IN A NATURAL LANGUAGE

(71) Applicant: FUJIFILM BUSINESS INNOVATION CORP., Tokyo (JP)

(72) Inventors: Kazuya Iimura, Kanagawa (JP); Yoshihisa Matsuo, Kanagawa (JP); Kiyoshi Tashiro, Kanagawa (JP); Atsushi Togo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 264 days.

(21) Appl. No.: 16/555,090

(22) Filed: Aug. 29, 2019

(65) Prior Publication Data
US 2020/0081970 A1 Mar. 12, 2020

(30) Foreign Application Priority Data

Sep. 12, 2018 (JP) .............................. JP2018-170844
Sep. 12, 2018 (JP) .............................. JP2018-170845
Sep. 12, 2018 (JP) .............................. JP2018-170846

(51) Int. Cl.
| | | |
|---|---|---|
| G06F 40/20 | (2020.01) | |
| G06F 3/04883 | (2022.01) | |
| G06F 3/04817 | (2022.01) | |
| G06Q 10/06 | (2012.01) | |
| G06F 40/174 | (2020.01) | |

(52) U.S. Cl.
CPC .......... *G06F 40/20* (2020.01); *G06F 3/04817* (2013.01); *G06F 3/04883* (2013.01); *G06F 40/174* (2020.01); *G06Q 10/0633* (2013.01)

(58) Field of Classification Search
CPC .. G06F 40/20; G06F 3/04817; G06Q 10/0633
See application file for complete search history.

(56) References Cited

U.S. PATENT DOCUMENTS

| | | | |
|---|---|---|---|
| 2017/0069315 A1* | 3/2017 | Chung | G06F 40/20 |
| 2018/0097940 A1* | 4/2018 | Beilis | H04M 3/5166 |
| 2018/0107653 A1* | 4/2018 | Das | G06F 40/205 |
| 2018/0329677 A1* | 11/2018 | Gruber | G06F 3/0488 |
| 2020/0012994 A1* | 1/2020 | Tokuchi | G06Q 10/063116 |

FOREIGN PATENT DOCUMENTS

| | | | | |
|---|---|---|---|---|
| EP | 3327719 A1 * | 5/2018 | ............ | G06F 3/167 |
| JP | H06-214776 A | 8/1994 | | |
| JP | 5600826 B1 | 10/2014 | | |

* cited by examiner

*Primary Examiner* — Asher D Kells
(74) *Attorney, Agent, or Firm* — Oliff PLC (57) ABSTRACT

A non-transitory computer readable medium storing a program that causes a processor to function as an information processing apparatus. The information processing apparatus includes a receiving unit configured to receive an input of a natural sentence that describes the content of a process for a process target, a generator configured to generate a series of processes including the process in accordance with the received natural sentence, and a display controller configured to perform control so as to display content information indicating contents of the generated series of processes.

4 Claims, 10 Drawing Sheets

NON-TRANSITORY COMPUTER READABLE MEDIUM FOR GENERATING A TARGET PROGRAM SOURCE USING SOFTWARE SPECIFICATION WRITTEN IN A NATURAL LANGUAGE

CROSS-REFERENCE TO RELATED APPLICATIONS

This application is based on and claims priority under 35 USC 119 from Japanese Patent Application Nos. 2018-170844, 2018-170845, and 2018-170846 all filed Sep. 12, 2018.

BACKGROUND

(i) Technical Field

The present disclosure relates to a non-transitory computer readable medium.

(ii) Related Art

Recently, a system that has a function of automatically generating a target program source by using a software specification written in a natural language as an input has been proposed (see JP-A 6-214776).

The system described in JP-A 6-214776 includes a terminal device that inputs a software specification, a processing device that processes the input software specification, and a storage device that stores the input software specification and information prepared by an internal process. The system generates a target software product by using a software specification written in a natural language as input information.

SUMMARY

Aspects of non-limiting embodiments of the present disclosure relate to providing a non-transitory computer readable medium that, even when a sentence input by an operator is described in a natural sentence not following certain rules, constructs a flow of a process corresponding to the input sentence and displays its content.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a non-transitory computer readable medium storing a program that causes a processor to function as an information processing apparatus. The information processing apparatus includes a receiving unit configured to receive an input of a natural sentence that describes the content of a process for a process target, a generator configured to generate a series of processes including the process in accordance with the received natural sentence, and a display controller configured to perform control so as to display content information indicating contents of the generated series of processes.

BRIEF DESCRIPTION OF THE DRAWINGS

Exemplary embodiment(s) of the present disclosure will be described in detail based on the following figures, wherein.

DETAILED DESCRIPTION

Hereinafter, an exemplary embodiment of the present disclosure will be described with reference to the accompanying drawings. In each figure, substantially the same constituent elements are denoted by the same reference numerals, and duplicate descriptions thereof will be omitted. The dimensional ratios among images illustrated in FIGS. 2 to 10 are not necessarily identical with actual dimensional ratios.

Summary of Exemplary Embodiment

An information processing apparatus according to the present exemplary embodiment includes a receiving unit configured to receive an input of a natural sentence that describes the content of a process for a process target, a generator configured to generate a series of processes including the process in accordance with the received natural sentence, and a display controller configured to perform control so as to display content information indicating contents of the generated series of processes.

The term "process target" refers to an object for which the information processing apparatus is to execute a process. Examples of the process target include documents such as application forms, contracts, specification sheets, and label forms. Here, the term "document" refers to a character, a figure, an image, a moving image, a voice, and a combination of some of these. The term "process" refers to a work executed by a function that the information processing apparatus has. The term "a series of processes" refers to a flow of a process that is constructed by associating at least one process with one another (which may be also referred to as a "workflow").

The term "display target" refers to a graphic representing a function or the content of a process in the form of a diagram. The term "process target" refers to an object for which the information processing apparatus is to execute a process. Examples of the process target include documents such as application forms, contracts, specification sheets, and label forms. The term "a series of processes" refers to a flow of a process that is constructed by associating at least one process with one another (which may be also referred to as a "workflow").

The term "natural sentence" refers to a sentence described in a language that people routinely use. The "natural sentences" in the present exemplary embodiment are any sentences whose meaning may be analyzed and from which words may be extracted. The "natural sentences" includes, for example, sentences including words which have the same meaning and pronunciation and which are described in plural different character strings, that is, expressive variations. The "natural sentences" include, for example, the spoken language used in oral communication in everyday life in addition to the written language used when writing documents.

The term "content information" refers to information indicating the contents of a constructed series of processes. The following configuration diagram, for example, falls into the "content information". That is, in the configuration diagram, graphics obtained by simplifying figures illustrating the contents of respective processes, graphics illustrating a state of a process target, and symbols indicating an exchange of the process target are arranged, and thus the configuration diagram visually represent the contents of processes.

Exemplary Embodiments (Configuration of Information Processing Apparatus)

Figure 1:
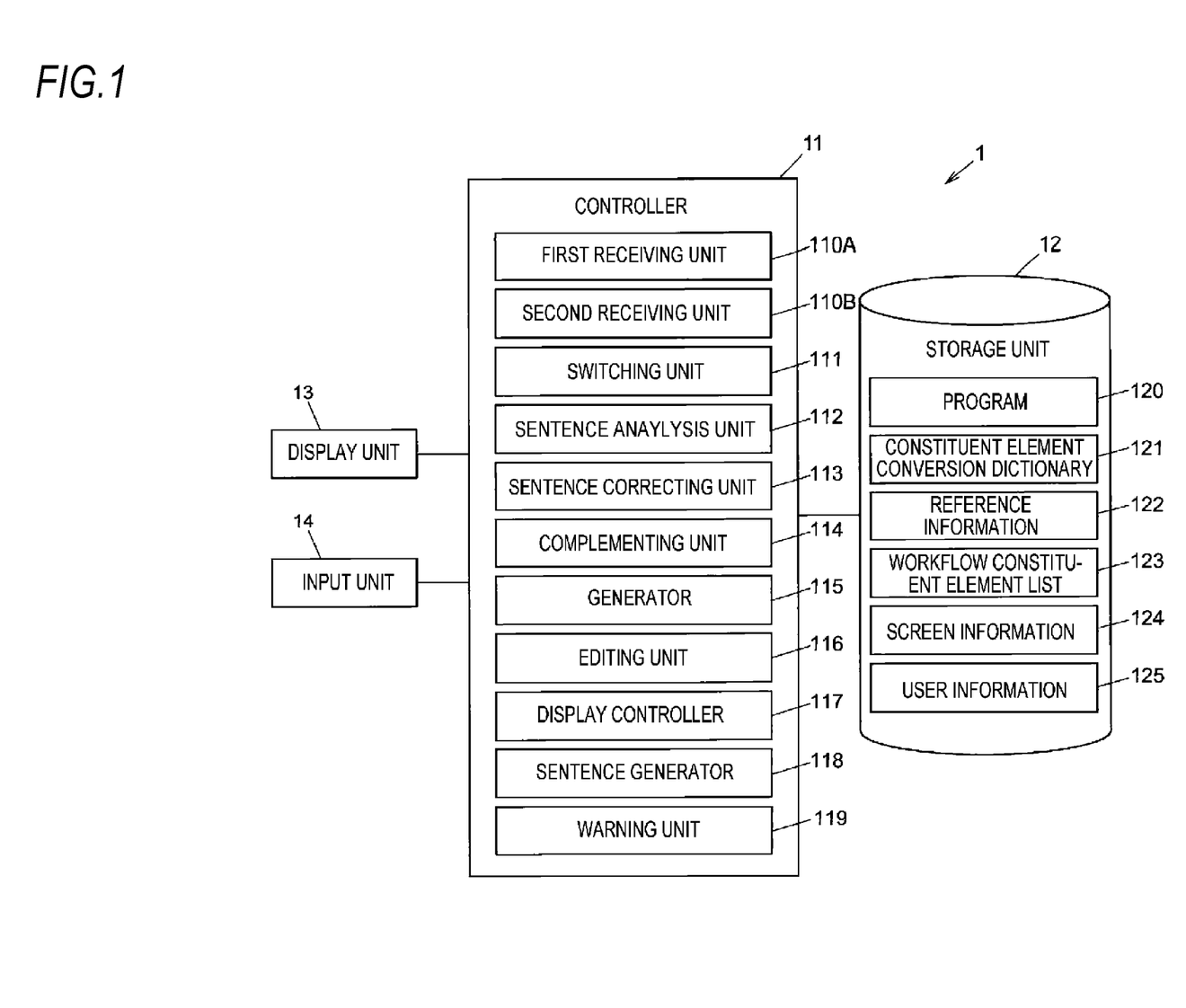
FIG. 1 is a block diagram illustrating an example of a control system of an information processing apparatus according to an exemplary embodiment of the present disclosure.

FIG. 1 is a block diagram illustrating an example of a control system of an information processing apparatus according to an exemplary embodiment of the present disclosure. The information processing apparatus 1 corresponds to, for example, an image forming apparatus such as a personal computer or a multifunction machine, or a portable information terminal such as a tablet terminal or a multifunctional mobile phone (smartphone).

As illustrated in FIG. 1, the information processing apparatus 1 includes a controller 11 that controls each unit, a storage unit 12 that stores various types of data, a display unit 13 that displays information, and an input unit 14 that inputs information.

The controller 11 includes, for example, a central processing unit (CPU) and an interface. The CPU operates in accordance with a program 120 recorded in the storage unit 12, to thereby function as, for example, a first receiving unit 110A, a second receiving unit 110B, a switching unit 111, a sentence analysis unit 112, a sentence correcting unit 113, a complementing unit 114, a generator 115, an editing unit 116, a display controller 117, a sentence generator 118, and a warning unit 119. The first receiving unit 110A is an example of a receiving unit. Details of the respective units 110 to 119 will be described later.

The storage unit 12 includes, for example, a read only memory (ROM), a random access memory (RAM), and a hard disk. The storage unit 12 stores various data such as a program 120, a constituent element conversion dictionary 121, reference information 122, a workflow constituent element list 123, screen information 124, and user information 125. Further, in the present specification, the term "store" (storage) is used when information is written into the storage unit 12, and the term "record" is used for cases where a certain content is written to the various information and cases where the various types of information is updated.

The constituent element conversion dictionary 121 is a conversion dictionary that replaces a word extracted by analyzing a natural sentence with an element that constitutes a workflow. Here, the workflow is a flow of processes (also referred to as a "series of processes") constructed in association with each other so that at least one process is consecutively executed for a process target.

The term "natural sentence" refers to a sentence described in a language that people use on a daily basis (hereinafter, also referred to as "natural language"), and includes, for example, a spoken language used in oral communication in everyday life in addition to a written language used when writing a sentence.

Specifically, the "natural sentences" include the following sentence types.

(a) sentences described in different notations despite the sentences have the same meaning and pronunciation (that is, sentences with different written forms) due to differences in types of characters used in notation, such as hiragana, katakana, kanji (Chinese characters), and alphabet, and inconsistency in okurigana when a kanji character(s) are used; and (b) sentences having the same meaning while being different to some extent in notation, due to (i) differences in the arrangement of constituent elements such as a subject, an object, a predicate, a modifier, and an adverb, (ii) omission of any of these constituent elements, (iii) differences in form of sentence ending such as the "です ます (desumasu)" style and the "だ である (dadearu)" style, (iv) differences in wording caused by using dialects, synonyms, and abbreviations, and (v) differences in formal syntax caused by typos and omissions of Japanese particles such as "て (te)", "に (ni)", "を (wo)", and "は (ha)".

Further, the "natural sentences" in the present exemplary embodiment may further include a type of sentences which are required to be described according to certain rules such as machine language, a function, and programming. Also, the language is not limited to Japanese.

The constituent element conversion dictionary 121 may be fixed information or may be periodically updated by a machine learning function such as deep learning.

The reference information 122 is information serving as a reference for determining a state of an input natural sentence. The reference information 122 includes, for example, a first criterion for determination as to whether a sentence is in a state where the sentence can be analyzed by the sentence analysis unit 112 (which will be described later), a second criterion for determination as to whether a sentence needs to be changed by the sentence correcting unit 113 and the complementing unit 114 (which will be described later), and a third criterion for determination as to whether an execution condition necessary for executing a workflow generated by the generator 115 (which will be described later) is satisfied. The reference information 122 is an example of a predetermined criterion.

The followings are examples of a case where the first criterion is not satisfied:

(1-A) When expressive variations exceed a predetermined range; and (1-B) When the grammar of natural sentences does not satisfy a certain criterion, and the like.

The criteria (1-A) and (1-B) are examples of a predetermined criterion.

The followings are examples of a case where the second criterion is not satisfied:

(2-A) When it is possible to analyze the meaning of a natural sentence but there is a lack in the structure of the natural sentence (for example, when plural descriptions relating to a process are included in one sentence and the description of an entity is omitted in the second and subsequent descriptions. See, for example, FIG. 3); and (2-B) When expressive variations within a predetermined range are included (for example, when a process target described as a "travel expense application form" is simply described as an "application form" when the process target is used for the second time or later. See, for example, FIG. 3).

The followings are examples of a case where the third criterion is not satisfied:

(3-A) When it is in a state where a workflow is not started (for example, when main setting values such as an entity and a destination are not set as in a case where a destination is not specified even though a process of transmitting a process target is included. See, for example, FIGS. 5 and 9); and (3-B) When a workflow is stopped halfway (for example, when inconsistency occurs in setting values or a flow of a process. See, for example, FIG. 7).

The main setting values are examples of specific elements.

The workflow constituent element list 123 is a table showing a list of elements that constitute a workflow (hereinafter, which may be referred to as "workflow constituent elements") such as an entity instructing execution of a process, a process target which is an object to be processed, a function of executing a process (hereinafter, which may be simply referred to as a "tool"). Examples of the "process" include creating a document, putting an electronic seal (hereinafter, which may be referred to as a "date stamp") on a document, and sending and receiving a document to a specific destination.

The screen information 124 is information relating to various screens displayed on the display unit 13 by the display controller 117 (which will be described later) and graphics constituting each screen. Examples of the screen include, a work screen 3 (see, for example, FIG. 2), an icon list screen 5 (see, for example, FIG. 8), a switching screen 7 (see, for example, FIG. 8), and a setting screen 9 (see, for example, FIG. 10).

Figure 8:
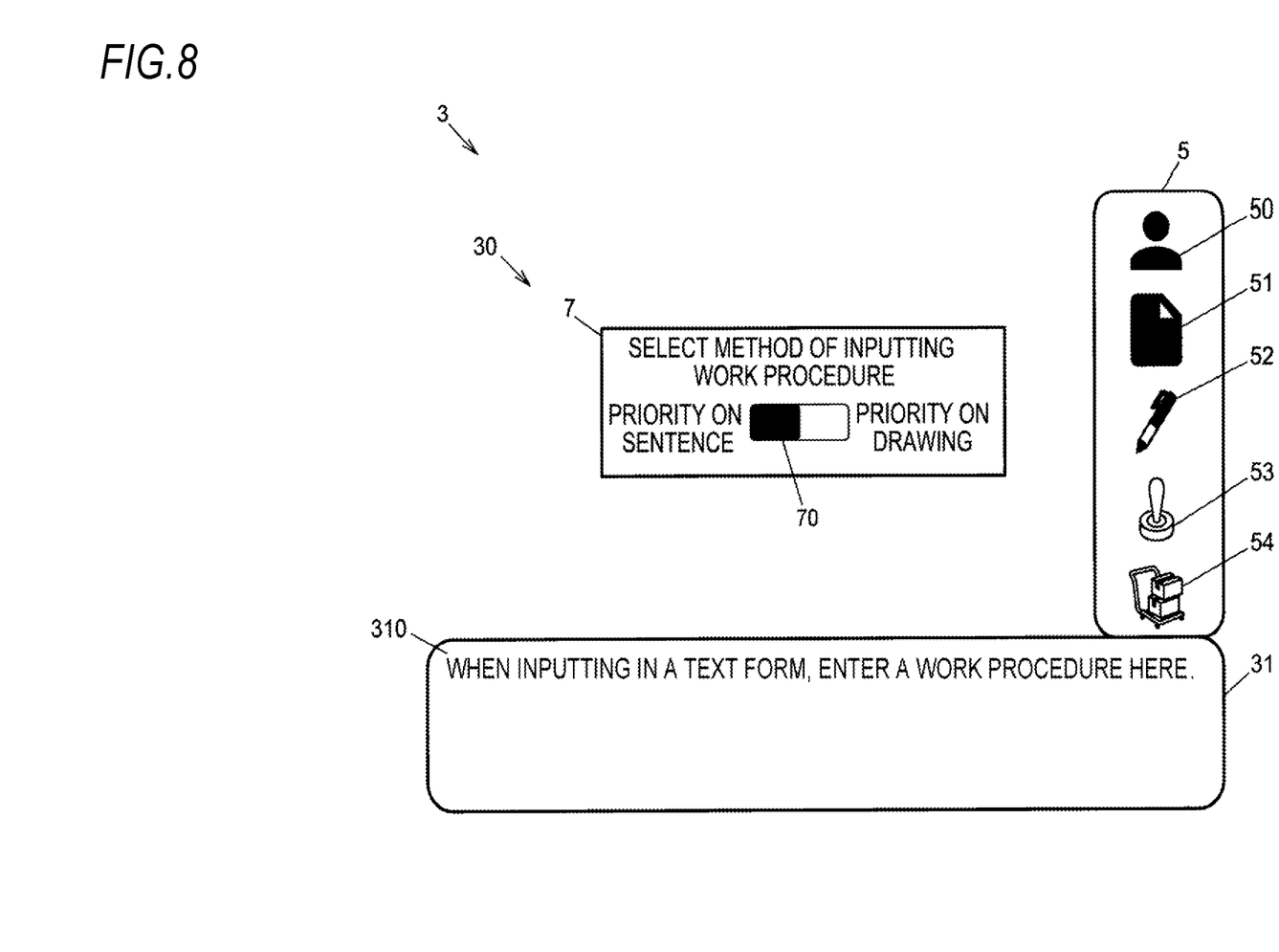
FIG. 8 is a diagram illustrating an example of a work screen on which an icon list screen and a switching screen are displayed.

Examples of the graphics include icons indicating the tools (see, for example, FIG. 8). Further, the term "icon" refers to (i) a thing which expresses the contents of an entity, a process target, a process, or a function by a figure, (ii) a thing which adds a letter or a symbol to the thing that expresses the entity, the process target, the process, or the function by the figure, or (iii) a thing including only letters and symbols. Details of the screens and icons will be described later.

The user information 125 is information in which user identification information that identifies a user and user attribute information indicating the attribute of the user are recorded in association with each other. The user identification information includes, for example, a name of the user and an ID of the user. Also, the user attribute information includes, for example, information indicating an affiliation to which the user belongs (for example, an organization such as a company, a division, a department, and a group; hereinafter, which is also referred to as a "tenant").

Next, details of the respective units 110 to 119 of the controller 11 will be described. The first receiving unit 110A receives a natural sentence which describes the contents of the process input from the input unit 14. The second receiving unit 110B receives an operation of moving an icon displayed on the display unit 13.

The switching unit 111 switches which one of (i) the control of the first receiving unit 110A and (ii) the control of the second receiving unit 110B is enabled. When the switching unit 111 switches so as to enable the control of the first receiving unit 110A, the first receiving unit 110A receives an input of a natural sentence. The second receiving unit 110B does not receive the operation of moving the icon.

In contrast, when the switching unit 111 switches so as to enable the control of the second receiving unit 110B, the second receiving unit 110B receives an operation of moving the icon. The first receiving unit 110A does not receive the input of a natural sentence.

The switching unit 111 may switch from a state in which the first receiving unit 110A is enabled to a state in which the second receiving unit 110B is enabled, according to, for example, an index indicating a degree of completion of a constructed workflow (hereinafter, which may be referred to as a "completion degree"). The completion degree may be evaluated according to, for example, a display amount of displayed icons (for example, the number of icons and the number of connection symbols (which will be described later)), the presence/absence of the display of a frame, and a setting condition of an association between processes by a connection symbol.

When the completion degree becomes equal to or less than a predetermined value, the switching unit 111 may switch from the state in which the first receiving unit 110A is enabled to the state in which the second receiving unit 110B is enabled. When the completion degree becomes greater than the predetermined value, the switching unit 111 may switch from the state in which the second receiving unit 110B is enabled to the state in which the first receiving unit 110A is enabled.

As an example of the case where the completion degree is equal to or less than the predetermined value, in a state in which no icon is displayed in a workflow display area 30 which will be described later (see, for example, FIG. 2), that is, when a framework serving as a basis of a workflow (which will be referred to as an "overview") is generated, the switching unit 111 may enable the first receiving unit 110A and construct the workflow preferentially using an input of a natural sentence.

As an example of the case where the completion degree is greater than the predetermined value, when an adjustment or a change of a detailed is made in a state in which a certain workflow is being constructed, the switching unit 111 may enable the second receiving unit 110B and construct the workflow preferentially using an operation of moving an icon.

The sentence analysis unit 112 analyzes the natural sentence received by the first receiving unit 110A, extracts elements constituting the natural sentence (hereinafter, which may be referred to as sentence constituent elements), compares the elements with the constituent element conversion dictionary 121 of the storage unit 12 to extract workflow constituent elements, and extracts the contents included in the natural sentence by further analyzing the extracted workflow constituent elements. The analysis performed by the sentence analysis unit 112 includes, for example, a morphological analysis, a syntax analysis, a semantic analysis, and a context analysis.

When the natural sentence input into the input unit 14, that is, the natural sentence received by the first receiving unit 110A does not satisfy the criteria recorded in the reference information 122 (in particular, the second criterion), the sentence correcting unit 113 corrects the sentence such that the criteria are satisfied. In addition, the term "correct" includes adding a certain description to a natural sentence (which may be referred to as "complement"), deleting at least one description from the natural sentence, replacing at least a portion of the description of the natural sentence with another description. A correction is an example of a change.

When the input natural sentence does not satisfy the criteria recorded in the reference information 122 (in particular, the third criterion (especially, 3-A)), the complementing unit 114 corrects this natural sentence to change the natural sentence to a natural sentence having information that may construct a workflow.

The phrase "may construct a workflow" means that information for constructing a provisional workflow is provided by the natural sentence, that is, information for determining workflow constituent elements is provided. For example, a situation where main setting values are not omitted falls into the phrase "may construct a workflow".

For example, when a destination is not described in a process of sending a process target, the complementing unit 114 complements a predetermined person as a provisional destination so as to change to a natural sentence forming a provisional workflow. The destination is an example of a specific element.

The generator 115 generates a workflow corresponding to the natural sentence received by the first receiving unit 110A, according to a result of the analysis performed by the sentence analysis unit 112. Specifically, the generator 115 compares the sentence constituent elements extracted by the sentence analysis unit 112 with the workflow constituent element list 123 stored in the storage unit 12, specifies, for example, an entity, a process target, a tool, or the like corresponding to each constituent element, and combines them to construct a workflow (see, for example, FIGS. 2 and 3).

In addition, the generator 115 generates a workflow for the process target according to the operation of moving the icon received by the second receiving unit 110B. Specifically, the generator 115 analyzes the arrangement of the icons (which may be referred to as a "layout") according to the operation of moving the icon received by the second receiving unit 110B to obtain a relationship between the icons, specifies the entity, the process target, and the tool, and combines them to construct a workflow.

The editing unit 116 edits the workflow generated by the generator 115 in accordance with the change of the natural sentence. Examples of the editing of the workflow include adding a process to a workflow, deleting a process from a workflow, changing the order of processes constituting a workflow, and changing setting values of processes constituting a workflow. The "change" includes both (i) change made by an operator's operation and (ii) change made by the sentence correcting unit 113 and the complementing unit 114 described above.

The display controller 117 performs control so as to display, on the display unit 13, display targets such as a configuration diagram 500 indicating a workflow (see, for example, FIG. 2) and a natural sentence. In the following description, the phrase "performs control so as to display on the display unit 13" may be simply described as "display". Further, it may be described as "being displayed on the display unit 13" with using a display target as a subject, or simply described as "displayed".

The sentence generator 118 generates a sentence which describes the contents of the workflow. Specifically, the sentence generator 118 extracts the constituent elements of the workflow generated by the generator 115 according to the operation of moving the icon received by the second receiving unit 110B, converts each of the extracted workflow constituent elements into a sentence constituent element, and generates a sentence describing the contents of the workflow. The sentence which describes the contents of the workflow is described in, for example, a natural sentence.

The warning unit 119 outputs a warning when the input natural sentence does not satisfy the criteria recorded in the reference information 122. A warning method by the warning unit 119 may be a known method such as a method of displaying warning information indicating a warning (which may be referred to as an "error message"), a method of outputting sound (an alarm or a buzzer) or voice, and a method of turning on an LED. In addition, the warning unit 119 may output warnings in different manners according to the various criteria.

The display unit 13 includes a display such as a liquid crystal display or an organic EL display. In addition to an operation unit to operate a mouse and a keyboard, the input unit 14 may use, for example, a recognition unit of recognizing voice such as a microphone and a reading unit of reading written information by scanning a document such as a procedural document. Further, the display unit 13 and the input unit 14 may be integrated to form a touch panel monitor capable of inputting and displaying information.

The display unit 13 and the input unit 14 are not necessarily provided inside the information processing apparatus 1, but may be provided in an external device such as a terminal device (a PC or a portable information terminal). In this case, the information processing apparatus 1 further includes a network communication unit, and may transmit and receive various types of information and signals to and from the terminal devices via the network. Plural terminal devices may be provided according to the number of operators.

Operation of Exemplary Embodiments

Next, an example of the operation of the information processing apparatus 1 will be described with reference to FIGS. 2 to 10. Hereinafter, the operation of the information processing apparatus 1 is divided into two portions:

(1) an operation of generating a workflow from a natural sentence and displaying the contents thereof, and (2) an operation of editing the workflow to generate a natural sentence and displaying the natural sentence.

Each of the operations will be described in detail below. Hereinafter, a specific example will be described in which a workflow including a process relating to an application of a travel expense and a process relating to approval thereof is generated. In addition, an application form (in particular, a travel expense application form) will be given as an example of a sentence to be processed (process target).

Figure 2:
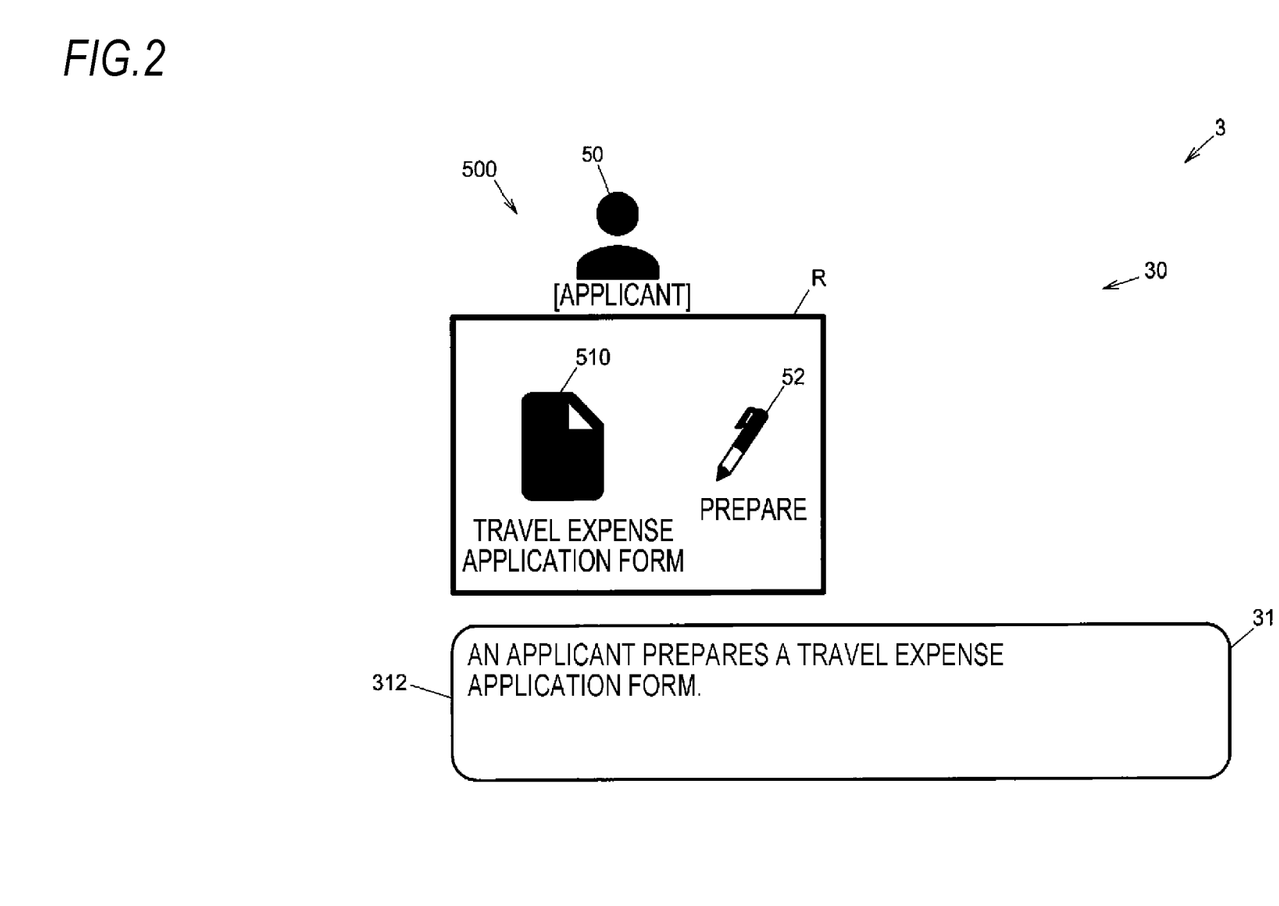
FIG. 2 is a diagram illustrating an example of a work screen to generate a workflow from a natural sentence and display the workflow.

(1) An Operation of Generating a Workflow from a Natural Sentence and Displaying the Contents Thereof FIG. 2 is a diagram illustrating an example of a work screen to generate a workflow from a natural sentence and display the workflow. As illustrated in FIG. 2, the work screen 3 is provided with, for example, a workflow display area 30 as an area that displays the configuration of the generated workflow and a sentence display field 31 that displays a sentence(s).

A configuration diagram 500 representing a workflow is displayed in the workflow display area 30. The configuration diagram 500 is a diagram illustrating the contents of the process to be executed in the workflow. In particular, the configuration diagram 500 visual illustrates how which entity processes which process target, that is, how who does what. The configuration diagram 500 is an example of content information. A natural sentence input to the input unit 14 and a natural sentence generated by the sentence generator 118 are displayed in the sentence display field 31.

(1-1) Generation of a Workflow to Prepare a Travel Expense Application form for Applying for travel expense When an applicant inputs a natural sentence to the input unit 14, the first receiving unit 110A receives the input natural sentence. The "applicant" is an example of an operator.

Next, the display controller 117 displays the natural sentence received by the first receiving unit 110A in the sentence display field 31. In addition, the sentence analysis unit 112 analyzes the natural sentence and refers to the constituent element conversion dictionary 121 to extract elements constituting the workflow.

For example, when a natural sentence 312 described as "an applicant prepares a travel expense application form" (hereinafter, which may be referred to as a "first natural sentence 312") is input, the sentence analysis unit 112 analyzes the first natural sentence 312 and extracts sentence constituent elements such as "applicant" indicating an entity, "travel expense application form" indicating a process target, and "prepare" indicating a process.

When the input natural sentence does not satisfy the first criterion recorded in the reference information 122 described above (for example, when it is difficult to analyze the sentence), the display controller 117 may display a message prompting the applicant to reenter a natural sentence and the warning unit 119 may output a warning prompting the applicant to reenter the natural sentence.

In addition, when the input natural sentence does not satisfy the second criterion recorded in the reference information 122 described above (for example, when the natural sentence includes certain expressive variations), the sentence correcting unit 113 may correct the natural sentence appropriately and the sentence analysis unit 112 may analyze the natural sentence corrected by the sentence correcting unit 113.

The generator 115 generates a workflow corresponding to the first natural sentence 312. Specifically, the generator 115 compares the workflow constituent elements extracted by the analysis of the sentence analysis unit 112 with the workflow constituent element list 123 and specifies an entity, a process target, a tool, or the like corresponding to each sentence constituent element.

More specifically, the generator 115 specifies an application entity as corresponding to "applicant", specifies a travel expense application form as corresponding to "travel expense application form", and specifies a preparation tool as corresponding to "prepare". The generator 115 also combines these specified information to construct the workflow.

The display controller 117 performs control so as to display the configuration diagram 500 illustrating the contents of the generated workflow. The configuration diagram 500 visually represents that the generated workflow is a process in which the applicant prepares the travel expense application form. The configuration diagram 500 corresponding to the first natural sentence 312 illustrated in FIG. 2 includes an applicant icon 50A corresponding to the applicant, a travel expense application form icon 510 corresponding to the travel expense application form, and a preparation tool icon 52 corresponding to "prepare".

Further, the display controller 117 may perform control so as to display the contents of the process according to the operator. Specifically, the display controller 117 may display the configuration diagram 500 with a frame R that separates the contents of the process for each operator who is an entity executing the workflow. In other words, it is visually displayed that the operator (the applicant in the example of FIG. 2) executes the process relating to the tool displayed in the frame R.

Figure 3:
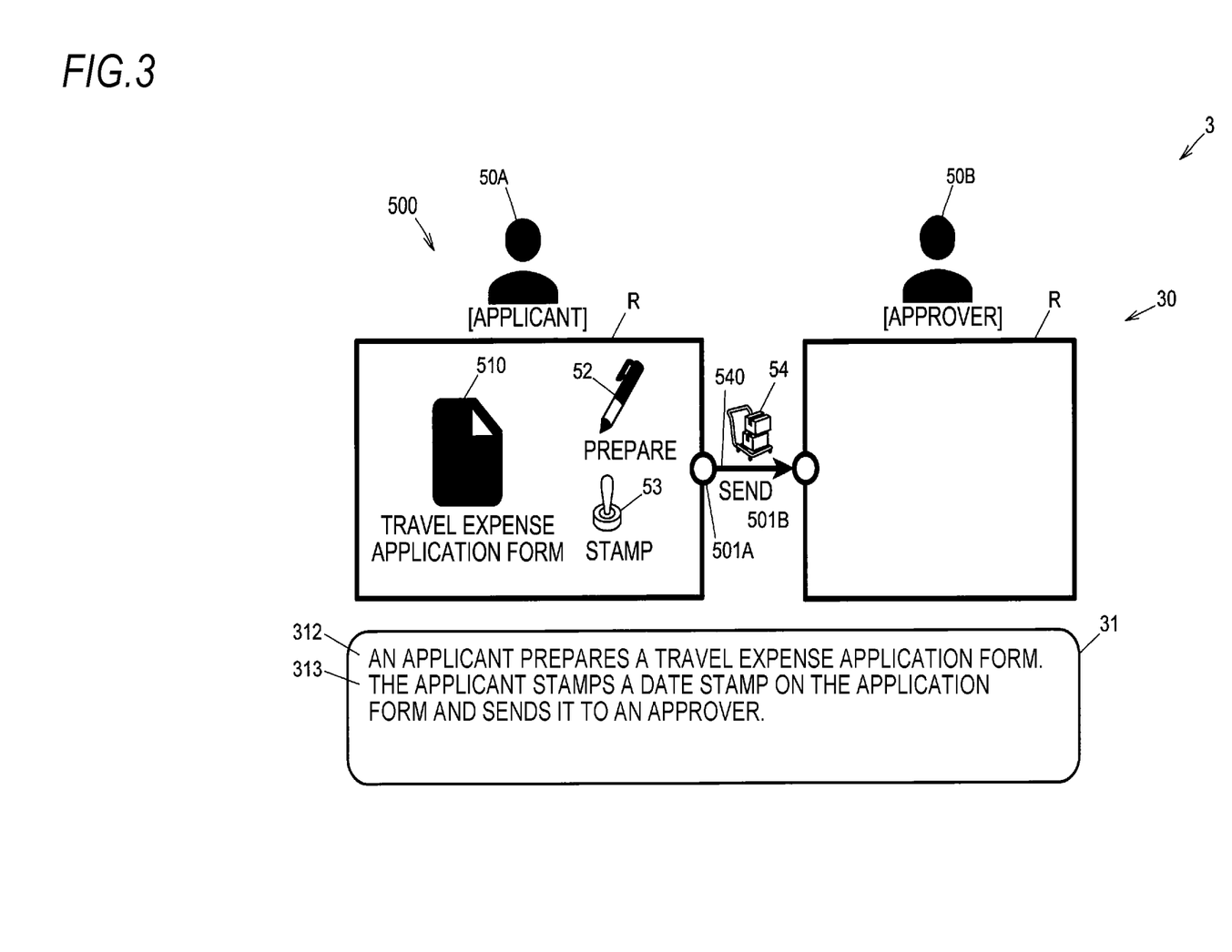
FIG. 3 is a diagram illustrating an example of a work screen to generate a workflow to send a process target.

(1-2) Generation of a Workflow of Sending a Travel Expense Application form to an Approver FIG. 3 is a diagram illustrating an example of a work screen 3 to generate a workflow to send a process target. Hereinafter, substantially the same contents as those described with reference to FIG. 2 will be simplified, and redundant explanation will be omitted. When the applicant inputs a natural sentence to the input unit 14, the first receiving unit 110A receives the input natural sentence, the display controller 117 displays this natural sentence in the sentence display field 31, and the sentence analysis unit 112 analyzes the natural sentence to extract elements constituting a workflow.

For example, when a natural sentence 313 described as "The applicant stamps a date stamp on the application form and sends it to an approver" (hereinafter, also referred to as a "second natural sentence 313") is input, the sentence analysis unit 112 analyzes the second natural sentence 313 and extracts sentence constituent elements such as the "applicant", "application form", "date stamp", "stamp", "approver", and "send".

The sentence analysis unit 112 further analyzes the extracted sentence constituent elements and specifies that the second natural sentence 313 includes two contents, that is, "an applicant stamps a date stamp on the application form" and "the applicant sends the application form stamped with the date stamp to the approver". The sending is an example of delivery. The process of sending is an example of a delivery process.

Further, the sentence correcting unit 113 corrects the "application form" to "travel expense application form" and complements the "applicant" who is the application entity before "sends it to the approver". The sentence analysis unit 112 may analyze the second natural sentence 313 corrected and complemented by the sentence correcting unit 113.

The generator 115 generates a workflow corresponding to the second natural sentence 313. The display controller 117 performs control so as to display the configuration diagram 500 according to the generated workflow. The configuration diagram 500 visually represents that the generated workflow is a process in which the applicant prepares the travel expense application form, stamps the date stamp on the prepared travel expense application form, and sends it to the approver.

As illustrated in FIG. 3, the configuration diagram 500 corresponding to the second natural sentence 313 includes an approver icon 50B, a stamp tool icon 53, a sending tool icon 54, a first connection symbol 501A, and a second connection symbol 501B in addition to the applicant icon 50A, the travel expense application form icon 510, and the preparation tool icon 52 illustrated in FIG. 2.

An arrow 540 extending from the first connection symbol 501A to the second connection symbol 501B is displayed between the first connection symbol 501A and the second connection symbol 501B. The arrow 540 indicates that the process target is sent from the applicant to the approver. The arrow 540 is an example of delivery information.

(1-3) Generation of a Workflow Relating to a Process by the Approver

Figure 4:
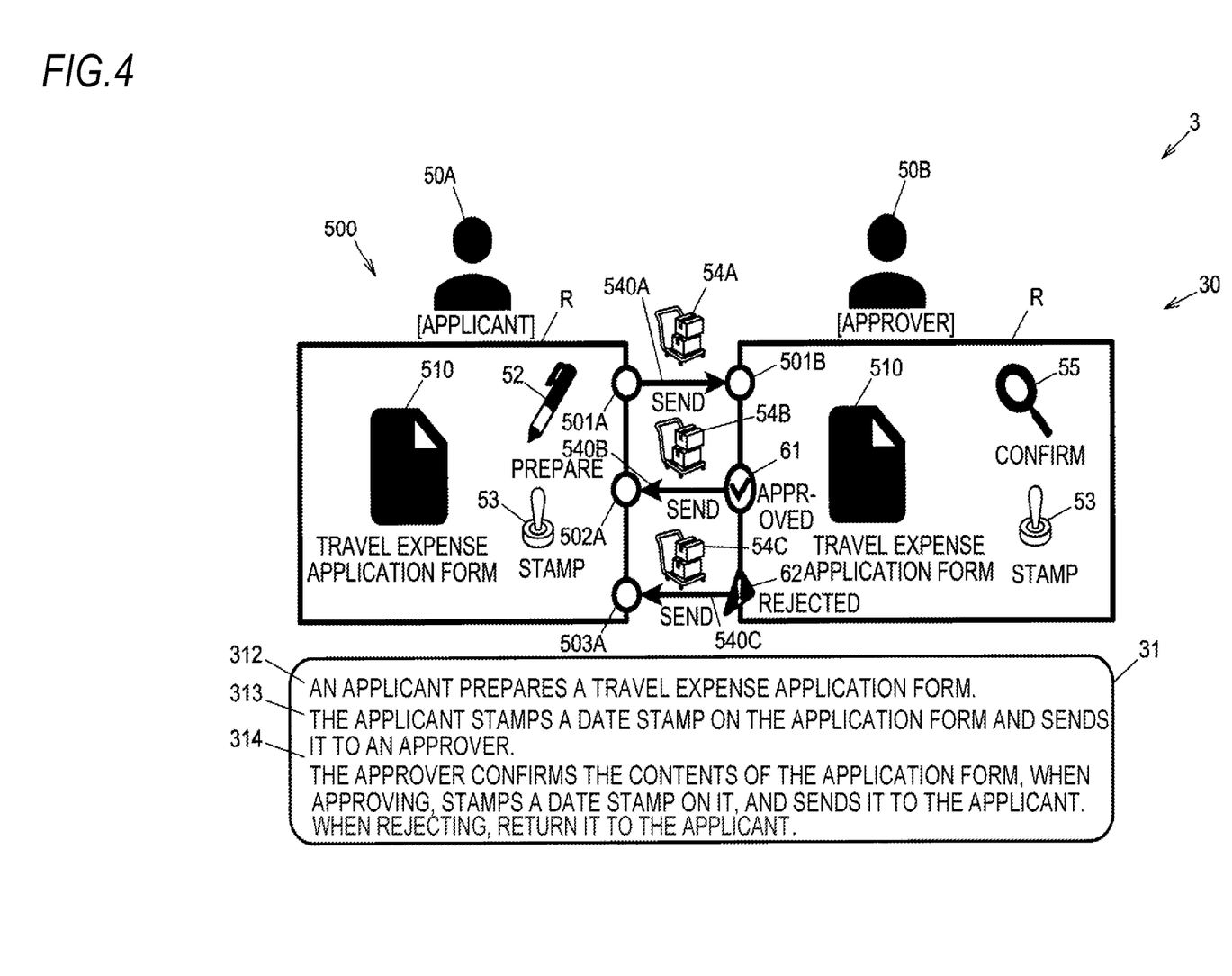
FIG. 4 is a diagram illustrating an example of a work screen to generate a workflow relating to a process by an approver.

FIG. 4 is a diagram illustrating an example of the work screen 3 to generate a workflow relating to a process by the approver. When the approver inputs a natural sentence to the input unit 14, the first receiving unit 110A receives the input natural sentence, the display controller 117 displays this natural sentence in the sentence display field 31, and the sentence analysis unit 112 analyzes this natural sentence to extract elements constituting the workflow. The approver is an example of the operator.

For example, when a natural sentence 314 described as "the approver confirms the contents of the application form, when approving, stamps a date stamp on it, and sends it to the applicant. When rejecting, return it to the applicant" (hereinafter, which may be referred to as a "third natural sentence 314") is input, the sentence analysis unit 112 analyzes the third natural sentence 314 to extract sentence constituent elements such as "approver", "the contents of the application form", "confirm", "when approving", "date stamp", "stamp", "applicant", "send", "when rejecting", and "return".

Further, the sentence analysis unit 112 further analyzes the extracted sentence constituent elements and specifies that the third natural sentence 314 includes four contents, that is, (i) "an approver confirms the contents of the application form", (ii) "approves the application form" or "rejects the application form" is a condition for performing a post-confirmation process, (iii) "when approving, the approver stamps a date stamp on the application form and sends it to the applicant", and (iv) "when rejecting, return it to the applicant". "Approve" and "reject" are examples of predetermined conditions. "Return" is an example of delivery. The process of returning is an example of a delivery process.

The generator 115 generates a workflow corresponding to the third natural sentence 314. The display controller 117 performs control so as to display the configuration diagram 500 according to the generated workflow. The configuration diagram 500 visually represents that the generated workflow is a process in which the applicant prepares the travel expense application form, stamps the date stamp on the prepared travel expense application form, and sends it to the approver, and thereafter, the approver confirms it and performs a process according to the result thereof.

As illustrated in FIG. 4, the configuration diagram 500 corresponding to the third natural sentence 314 includes a confirmation tool icon 55, an approval symbol 61, a rejection symbol 62, a third connection symbol 502A, and a fourth connection symbol 503A in addition to the constituent elements illustrated in FIGS. 2 and 3.

The approval symbol 61 indicates a condition for executing the next process on the travel expense application form (for example, a process of stamping the date stamp on the travel expense application form and sending it to the applicant). Further, the rejection symbol 62 indicates a condition for executing the next process on the travel expense application form (for example, a process of returning the application form to the applicant).

Arrows 540A to 540C displayed between the first connection symbol 501A and the second connection symbol 501B, between the third connection symbol 502A and the approval symbol 61, and between the fourth connection symbol 503A and the rejection symbol 62, respectively, indicate the direction of sending the travel expense application form (see "510") between the applicant and the approver. The applicant and the approver are examples of plural operators. The arrows 540A to 540C are examples of delivery information.

(1-4) When a Natural Sentence is Changed

Figure 5:
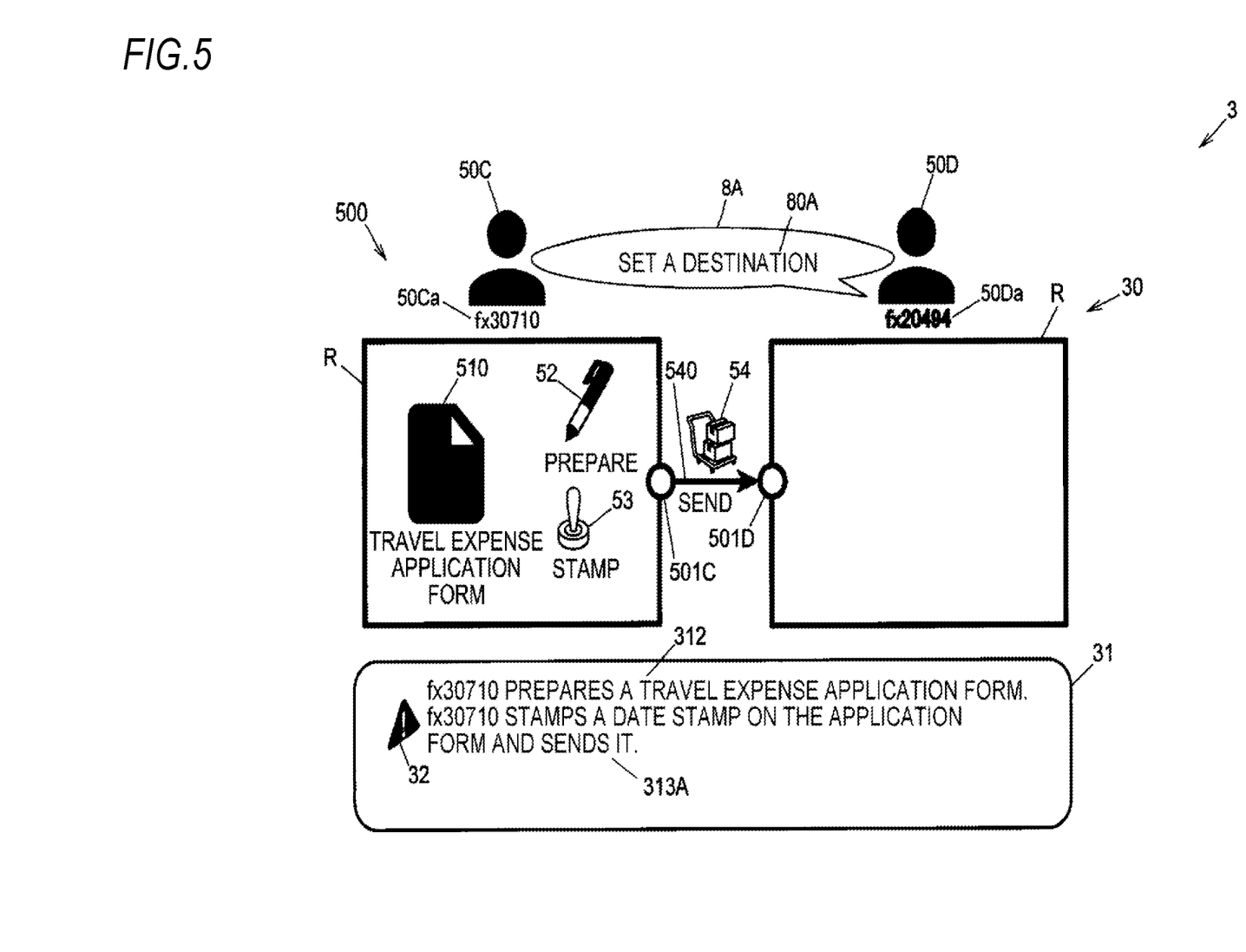
FIG. 5 is a diagram illustrating an example of a work screen when a natural sentence that does not satisfy a criterion is input.

Change of the workflow when a natural sentence is changed will be described with reference to FIGS. 5 to 7. FIG. 5 is a diagram illustrating an example of the work screen 3 when a natural sentence that does not satisfy the criteria recorded in the reference information 122 is input. FIG. 5 illustrates a case where a person having user identification information 50Ca (refer to the character string "fx30710") is the applicant in place of the "applicant" illustrated in FIG. 3.

When the natural sentence that does not satisfy the criteria recorded in the above-described reference information 122 is input, the warning unit 119 outputs a warning symbol 32 indicating a warning as illustrated in FIG. 5. The warning symbol 32 is, for example, a symbol including an exclamation point mark which calls attention. The warning symbol 32 is an example of warning information. With reference to FIG. 5, descriptions will be made on a case where the approver who is a destination is not described in the second natural sentence 313 describing the sending of the application form, as an example of a case where in particular, the criterion (3-A) is not satisfied among the criteria recorded in the reference information 122.

In addition, when a second natural sentence 313A in which the approver who is the destination of the application form is not described is input, the complementing unit 114 complements a specific person as a temporary approver. The "specific person" may be set according to the type of the application form.

The "specific person" corresponds to, for example, a boss or a supervisor who belongs to the same tenant as the applicant specified by the user information 125 stored in the storage unit 12. A list of candidates who can be the "specific person" may be set in advance according to the user information 125. The specific person is an example of a predetermined person.

The generator 115 generates a workflow corresponding to the natural sentence complemented with the tentative approver by the complementing unit 114.

The display controller 117 performs control so as to display the configuration diagram 500 indicating this workflow. As illustrated in FIG. 5, the configuration diagram 500 includes a worker icon 50D relating to a person having the user identification information 50Da (see a character string "fx20494") set as the tentative approver.

In addition, the display controller 117 may emphasize and display the worker icon 50D and/or the user identification information 50Da. For example, the display controller 117 may display the color of the user identification information 50Da differently from the color of the other operator icon 50 (see, for example, FIG. 8), may display the user identification information 50Da in bold or oblique letters, or may blink and display it.

Further, the display controller 117 performs control so as to further display a first chat bubble symbol 8A including a first message 80A such as, for example, "set a destination". The first chat bubble symbol 8A prompts the operator to input the destination. The first chat bubble symbol 8A may be displayed to indicate the destination to be set. The first chat bubble symbol 8A is an example of an input assistance unit.

Figure 6:
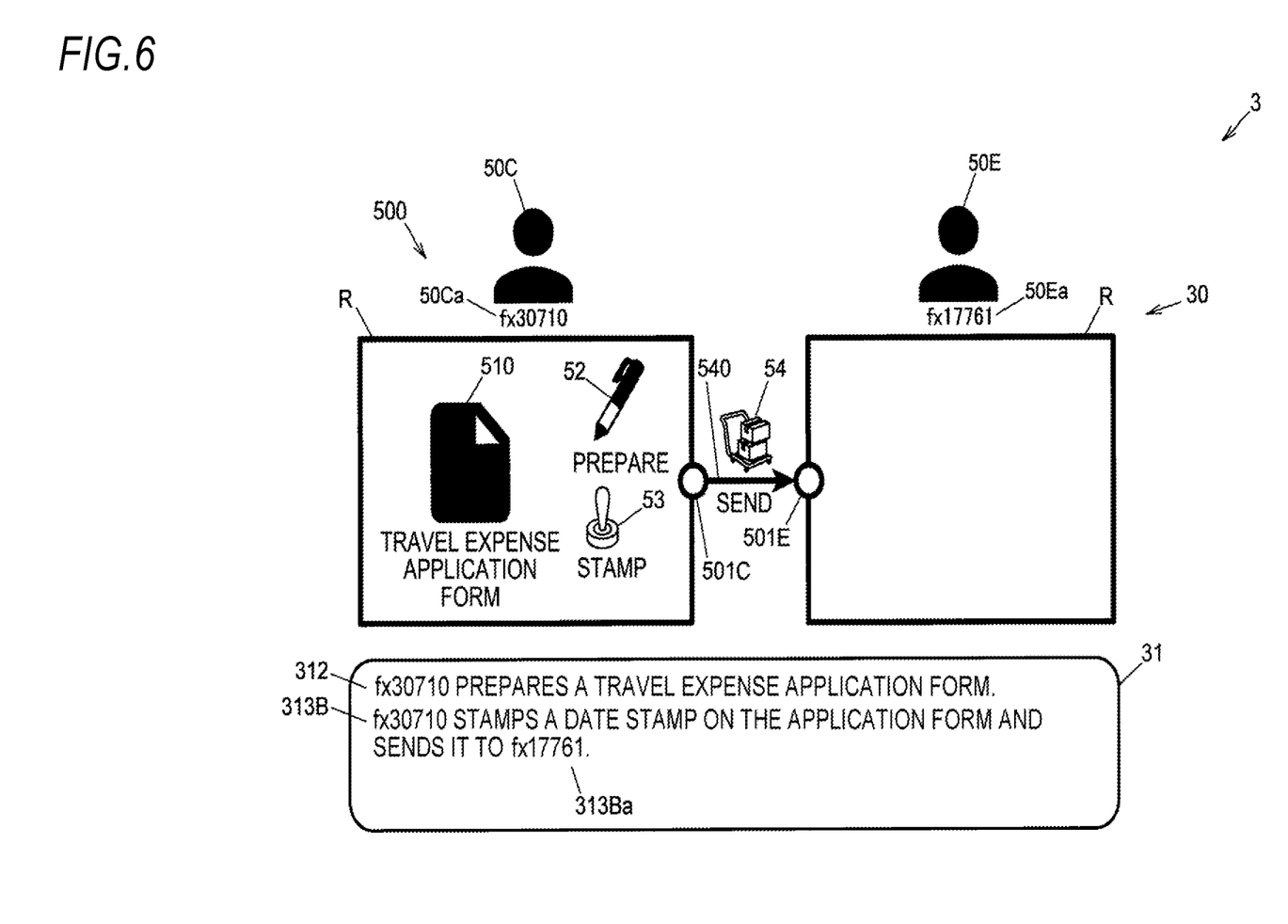
FIG. 6 is a diagram illustrating an example of a work screen on which a configuration diagram is displayed when the natural sentence is changed.

FIG. 6 is a diagram illustrating an example of the work screen 3 on which the configuration diagram 500 is displayed when natural sentences are changed. As an example, descriptions will be made on a case where a change is made to add a destination to the second natural sentence 313A in which the destination of the application form illustrated in FIG. 5 is not described. As illustrated in FIG. 6, when destination information 313Ba is input to the second natural sentence 313A by operating the input unit 14, the editing unit 116 edits the workflow generated by the generator 115 in accordance with this change.

As illustrated in FIG. 6, the display controller 117 performs control so as to display the changed second natural sentence 313B with the added destination information 313Ba in the sentence display field 31, and change the configuration diagram 500 in accordance with the destination information 313Ba which is input as the addition and the display the changed configuration diagram 500. The phrase "change the configuration diagram 500" means changing the layout of various icons constituting the configuration diagram 500 or changing the content displayed on the icon or a display manner of the icon.

Specifically, the display controller 117 performs control so as to change the worker icon 50D which relates to the person who has the user identification information 50Da (see the character string "fx20494") and who is set as the tentative approver, to a worker icon 50E which relates to the person having user identification information 50Ea (see a character string "fx17761") relating to the added destination information 313Ba, and display the changed worker icon.

Figure 7:
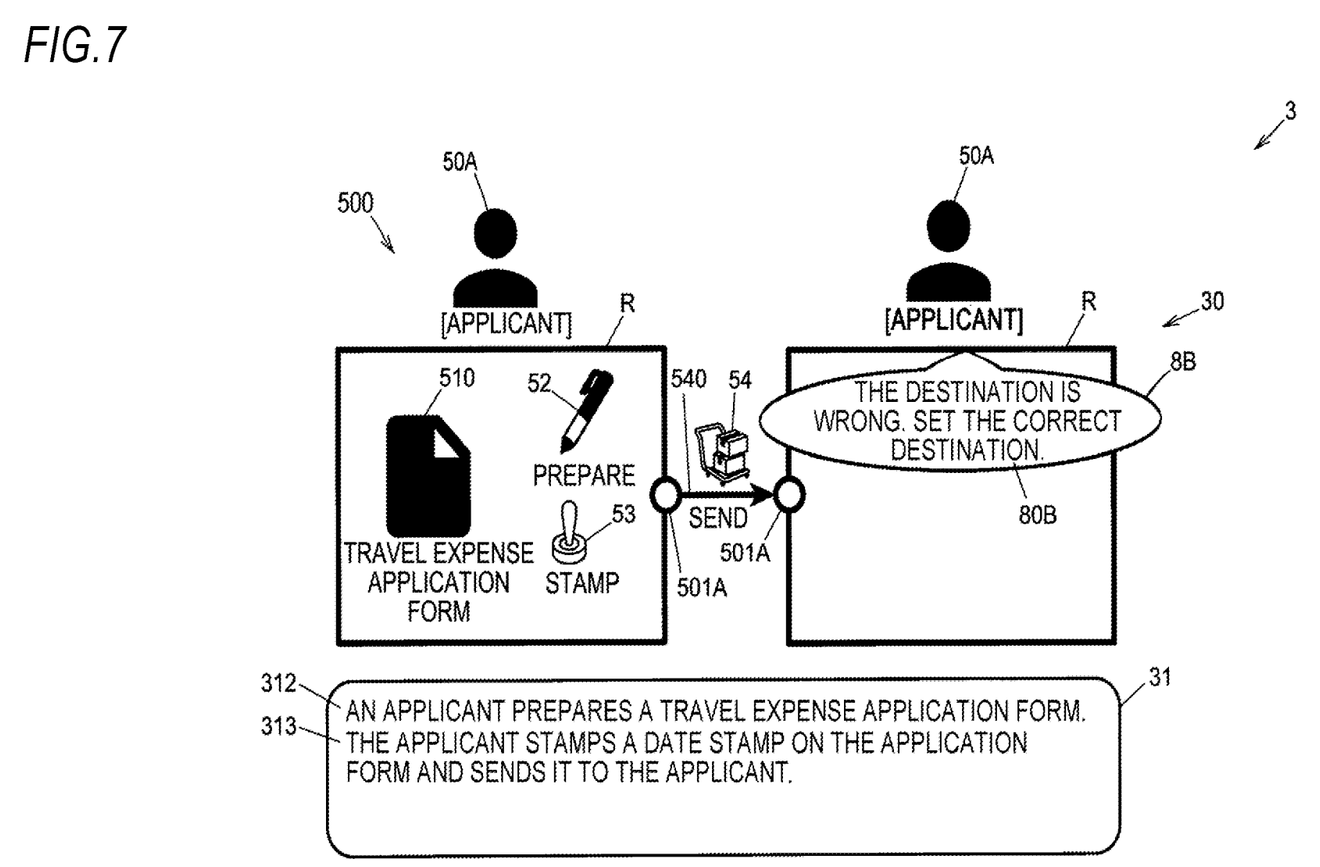
FIG. 7 is a diagram illustrating another example of the work screen when the natural sentence that does not satisfy the criterion is input.

FIG. 7 is a diagram illustrating another example of the work screen 3 when a natural sentence that does not satisfy the criteria recorded in the reference information 122 is input. In FIG. 7, descriptions will be made on a case where the approver who is the destination is described as an "applicant" in the second natural sentence describing the sending of the application form, as an example of a case where in particular, the criterion (3-B) is not satisfied among the criteria recorded in the reference information 122. In the example illustrated in FIG. 7, since the applicant is set as the approver, there is a possibility that the process may be stopped halfway when the workflow is executed. That is, this example is an example of a case where inconsistency occurs between setting values.

When a second natural sentence 313C in which the approver is described as an "applicant" is input, the generator 115 generates a workflow that temporarily has the applicant as the approver. The display controller 117 performs control so as to display the configuration diagram 500 indicating this workflow. As illustrated in FIG. 7, the configuration diagram 500 includes an applicant icon 50A set as the approver. The display controller 117 may emphasize and display the color of the applicant icon 50A.

The display controller 117 performs control so as to display a second chat bubble symbol 8B including a second message 80B that "The destination is wrong. Set the correct destination". The second chat bubble symbol 8B prompts the operator to reenter the correct destination. The second chat bubble symbol 8B may be displayed to indicate a destination to be reentered (for example, the applicant icon 50A). The second chat bubble symbol 8B is an example of the input assistance unit. The warning unit 119 may output the warning symbol 32, for example, at a position indicating the second natural sentence 313C.

In addition, although not illustrated, when the second natural sentence 313 is corrected and the "applicant" described as the approver in the second natural sentence 313 is changed to another person appropriate for the approver, similarly to the operation described with reference to FIG. 6, the editing unit 116 edits the workflow in accordance with this change, and the display controller 117 performs control so as to change the configuration diagram 500 according to the change of the second natural sentence 313 and display the changed configuration diagram 500.

In the above-described example, descriptions have been made on a case where the input natural sentence does not satisfy the criteria recorded in the reference information 122. When a change is made according to an operator's operation while the input natural sentence satisfies the criteria recorded in the reference information 122, the same operations are performed. That is, the editing unit 116 edits the workflow in accordance with the change of the natural sentence displayed in the sentence display field 31, and the display controller 117 performs the control so as to change the configuration diagram 500 according to the change of the natural sentence and display the changed configuration diagram 500.

(2) Operation of Generating a Natural Sentence from a Configuration Diagram and Display the Generated Natural Sentence (2-1) Operation of Constituting a Configuration Diagram FIG. 8 is a diagram illustrating an example of the work screen 3 on which an icon list screen and a switching screen are displayed. The icon list screen 5 is a list showing respective icons indicating workflow constituent elements. As illustrated in FIG. 8, the icon list screen 5 includes the operator icon 50, the application form icon 51, the preparation tool icon 52, the stamp tool icon 53, and the sending tool icon 54 as described above. Although not illustrated in FIG. 8 for the convenience of notation, the icon list screen 5 includes a confirmation tool icon 55.

Examples of the operator icon 50 include the applicant icon 50A, the approver icon 50B, and other worker icons 50C, 50D, and 50E indicating persons having specific user identification information. In addition, examples of the application form icon 51 include the travel expense application form icon 510. The icons illustrated in FIG. 8 are merely examples, and the icons are not limited thereto.

The switching screen 7 instructs the operator to switch from (1) an operation of generating a workflow from the natural sentence described above and displaying the contents (hereinafter, which may be referred to as an "operation (1)") to (2) an operation of editing the workflow to generate a natural sentence and displaying the generated natural sentence (hereinafter, which may be referred to as an "operation (2)"). The switching screen 7 includes, for example, a switching button 70 that switches between the operation (1) and the operation (2). Further, the phrase "priority on sentence" indicates the operation (1), and the phrase "priority on drawing" indicates the operation (2). The switching screen 7 is an example of the switching unit 111.

When switching from the "priority on drawing" (that is, the state in which the operation (2) is selected) to the "priority on sentence" (that is, the state in which the operation (1) is selected) is performed by the switching button 70, the switching unit 111 switches from a state in which the control of the second receiving unit 110B is enabled to a state in which the control of the first receiving unit 110A is enabled. The switching button 70 is an example of the switching unit 111.

When switching from the "priority on sentence" (that is, the state in which the operation (1) is selected) to the "priority on drawing" (that is, the state in which the operation (2) is selected) is performed by the switching button 70, the switching unit 111 switches from the state in which the control of the first receiving unit 110B is enabled to the state in which the control of the second receiving unit 110A is enabled.

Further, when the "priority on sentence" is selected by the switching button 70, an input guidance sentence 310 that gives the operator guidance on an input of a sentence (for example, "when inputting in a text form, enter a work procedure here") is displayed in the sentence display field 31.

The display controller 117 may perform control so as to display the switching screen 7 on the display unit 13 according to a display instruction of the operator. In addition, when the natural sentence received by the first receiving unit 110A does not satisfy the various criteria recorded in the reference information 122 (in particular, the criterion (1-A) or (1-B)), the display controller 117 may perform control so as to display the switching screen 7 on the display unit 13. Further, when the first receiving unit 110A does not receive the input of a natural sentence within a predetermined time, the display controller 117 may perform control so as to display the switching screen 7 on the display unit 13.

Without the switching screen 7 being displayed, it may be performed to switch between (i) enabling the control of the first receiving unit 110A and (ii) enabling the control of the second receiving unit 110B, according to the completion degree of the workflow.

Figure 9:
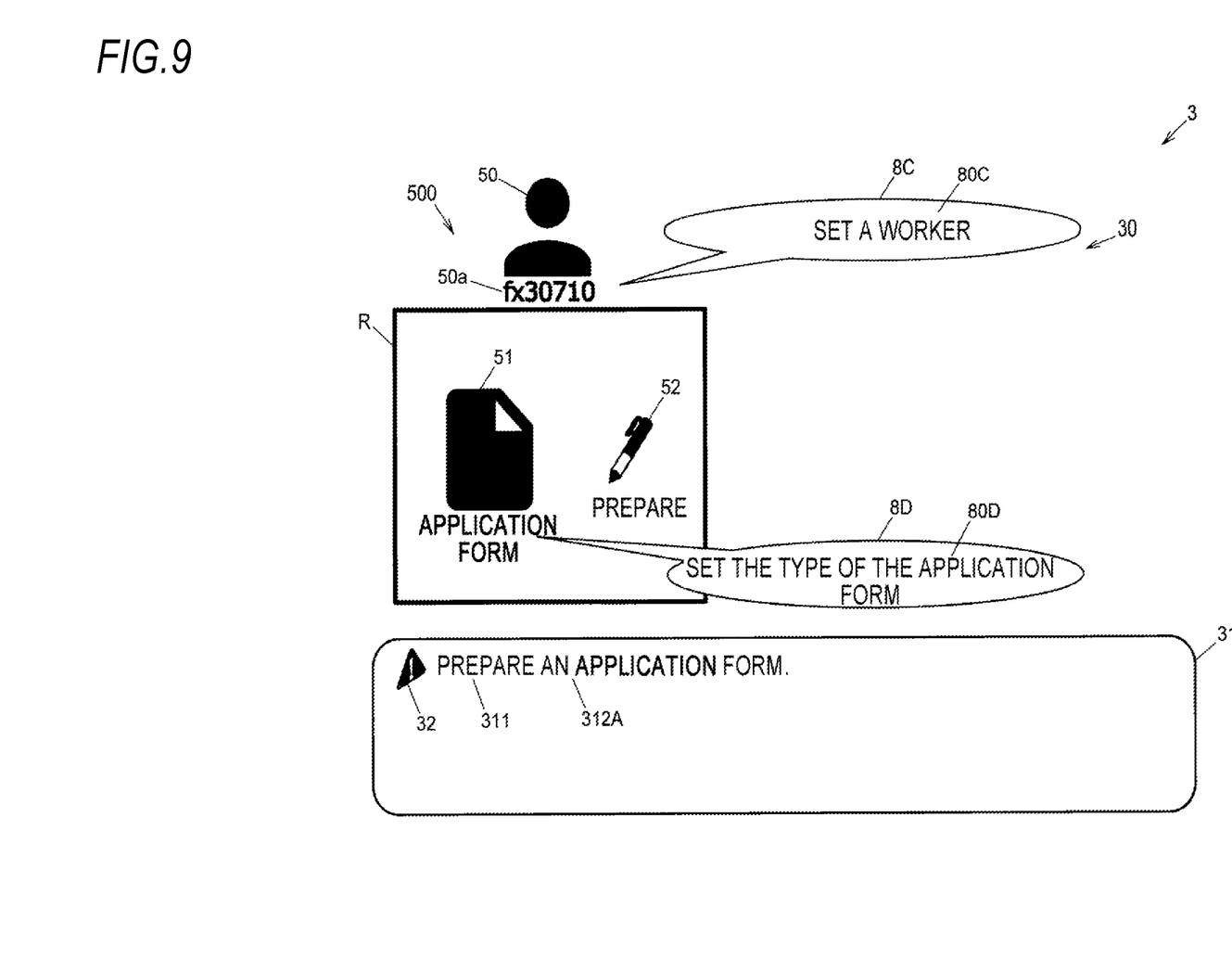
FIG. 9 is a diagram illustrating an example of a work screen to generate a sentence from a configuration diagram and display the generated sentence.

FIG. 9 is a diagram illustrating an example of the work screen 3 to generate a sentence from a configuration diagram and display the generated sentence. When the "priority on drawing" is selected by the switching button 70, the control by the second receiving unit 110B is enabled, so that a configuration diagram 500 representing the workflow in the workflow display area 30 may be prepared.

When the various icons 50 to 55 displayed on the icon list screen 5 are operated, the second receiving unit 110B receives this operation. As illustrated in FIG. 9, when the configuration diagram 500 is prepared by arranging the operator icon 50, the application form icon 51, and the preparation tool icon 52 side by side in the workflow display area 30, the generator 115 analyzes the layout of the configuration diagram 500 and generates a workflow corresponding to the configuration diagram 500. Further, the sentence generator 118 generates a natural sentence that describes the contents of the workflow generated by the generator 115.

As an example, in the case of the configuration diagram 500 illustrated in FIG. 9, the sentence generator 118 generates the first natural sentence 312A described as "prepare an application form".

The generated natural sentence is displayed in the sentence display field 31 by the display controller 117. For example, the display controller 117 may perform control so as to display the natural sentence generated by the sentence generator 118 in accordance with a display instruction of the operator. Alternatively, the display controller 117 may perform control so as to display the natural sentence generated by the sentence generator 118 when the operator's icon is being operated, that is, in real time.

Although not illustrated, the display controller 117 may perform control so as to emphasize and display a portion, associated with the icon on which the moving operation is being performed, of the natural sentence. For example, when an operation of moving the preparation tool icon 52 illustrated in FIG. 9 is performed, a control may be performed so as to display a corresponding character string "prepare" in the natural sentence in a noticeable manner such as color change, boldface type, or blinking.

(2-2) Operation of Changing a Configuration Diagram

When an icon is changed, the editing unit 116 edits the workflow according to the change of the icon. Examples of the "change of an icon" include a change in icon layout, that is, movement of an icon, addition of an icon, deletion of an icon, and change of a setting value which causes an icon to function.

(a) Change of an Icon Layout

Referring back to FIG. 6, an example of changing an icon layout will be described as an example of the operation of changing the configuration diagram. The sentence generator 118 changes the natural sentence according to the edited workflow. Further, the display controller 117 performs control so as to display the changed natural sentence.

For example, as illustrated in FIG. 6, when a person having the user identification information 50Ea of the character string "fx17761" is set to the worker icon indicating the approver (see 50Ea), the editing unit 116 edits the workflow according to this setting, and the sentence generator 118 changes the natural sentence according to the editing of the workflow, and the display controller 117 performs control so as to display the changed natural sentence.

Although not illustrated, the display controller 117 may perform control so as to emphasize and display the changed portion of the natural sentence. Alternatively, the display controller 117 may perform control so as to display only the changed portion.

(b) Change of a Setting Value

Next, an example of changing setting values will be described as another example. As illustrated in the example of FIG. 9, when the operator icon 50 is simply arranged, that is, when nothing is set to the operator icon 50, a sentence that does not include a subject corresponding to an entity of preparation of the application form is generated. In this case, the warning unit 119 outputs a warning symbol 32 indicating that an applicant is not set around the first natural sentence 312A.

Further, the generator 115 may generate a workflow with a predetermined person (a person having the user identification information 50a (refer to the character string "fx30710")) as a tentative applicant. In this case, the display controller 117 may perform control so as to display the user identification information 50a (refer to the character string "fx30710") relating to the predetermined person, in the configuration diagram 500.

Further, the "predetermined person" may be defined according to the user information 125. For example, the predetermined person may be selectable from users of the same tenant recorded in the user information 125.

Further, the display controller 117 performs control so as to display a third chat bubble symbol 8C including a third message 80C such as "set a worker". The third chat bubble symbol 8C prompts the operator to set the applicant. The third chat bubble symbol 8C may be displayed to indicate the applicant to be set. The third chat bubble symbol 8C is an example of an input assistance unit.

In addition, when the application form icon 51 is simply arranged, that is, when nothing is set to the application form icon 51, the display controller 117 performs control so as to display a fourth chat bubble symbol 8D including a fourth message 80D such as "set the type of the application form". The fourth chat bubble symbol 8D prompts the operator to set the type of the application form. The fourth chat bubble symbol 8D may be displayed to indicate an application form to which a type is to be set. The fourth chat bubble symbol 8D is an example of the input assistance unit.

Further, in this case, the display controller 117 may perform control so as to emphasize and display an object character string 311 indicating the "application form" in the first natural sentence 312A displayed in the sentence display field 31.

Figure 10:
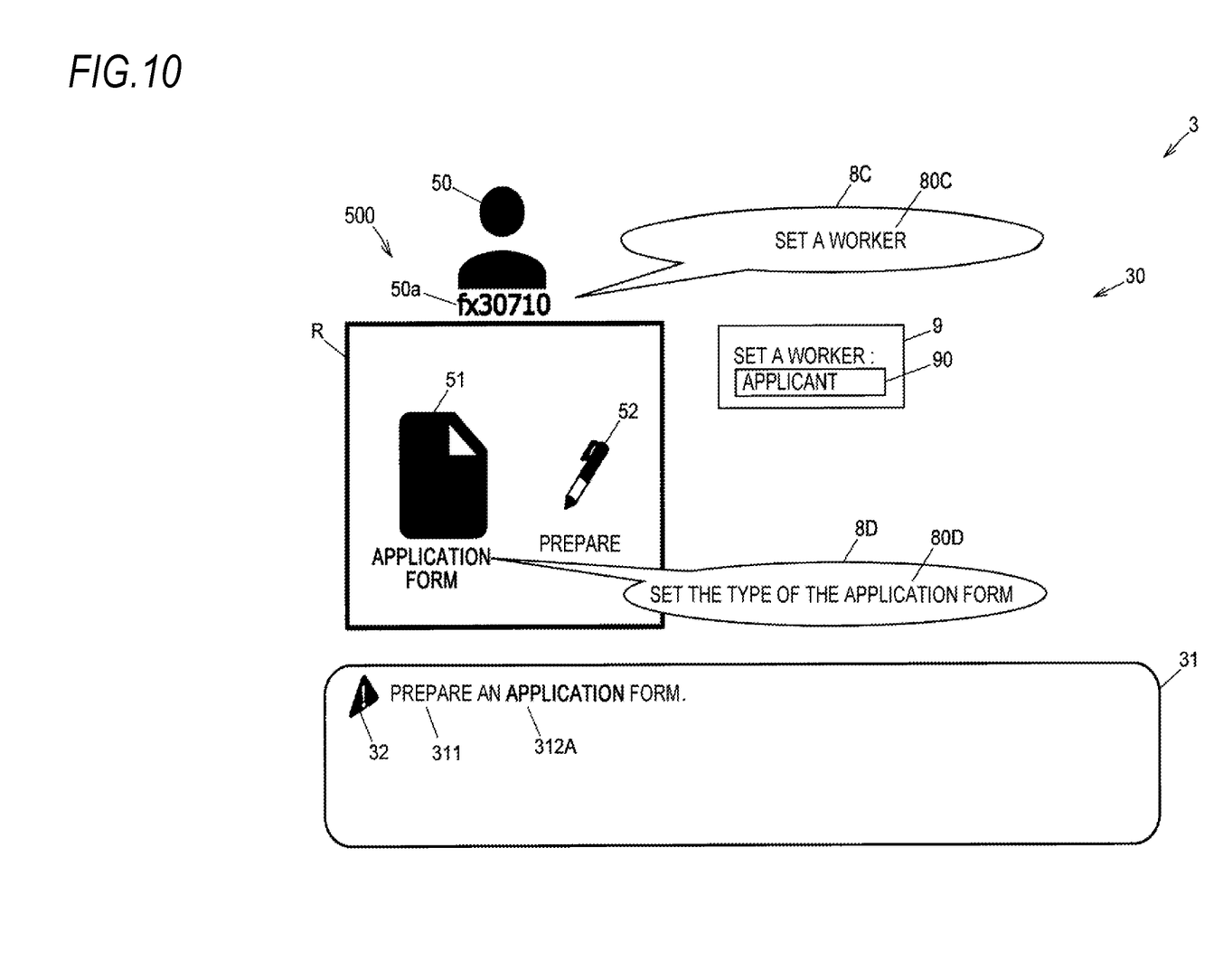
FIG. 10 is a diagram illustrating an example of a work screen on which a setting screen is displayed.

FIG. 10 is a diagram illustrating an example of the work screen 3 on which the setting screen is displayed. As illustrated in FIG. 10, the setting screen 9 is provided with a setting value input field 90 that inputs a setting value. The operator may set the setting value by inputting the setting value on the setting screen 9. The setting screen 9 illustrated in FIG. 10 is a screen to set the applicant. The same applies to setting of the type of the application form and setting of other setting values. Detailed description thereof will be omitted.

When the configuration diagram 500 is changed by an operation of setting the setting value using the setting screen 9 or the operation of moving the icon, the editing unit 116 edits the workflow according to the change of the position of the icon. Further, the sentence generator 118 generates a natural sentence describing the contents of the workflow edited by the editing unit 116. That is, the sentence generator 118 changes the natural sentence according to the change of the configuration diagram 500.

For example, when the applicant is set, the sentence generator 118 adds the subject "applicant" to the beginning of the first natural sentence 312A. Although not illustrated, the display controller 117 performs control so as to add the character string "applicant" for display, in real time in accordance with the display instruction by the operator or in synchronization with the operation of moving the icon.

Similarly, when the type of the application form is set (for example, the travel expense application form is set), the sentence generator 118 changes the object character string 311 from the "application form" to the "travel expense application form". Although not illustrated, the display controller 117 performs control so as to change the "application form" to "travel expense application form" for display. Further, the display controller 117 performs control so as to change the user identification information 50a in the configuration diagram 500 to the character string "applicant" for display (see, for example, FIG. 2).

In the above-described example, the workflow is changed by setting the setting value using the setting screen 9. Alternatively, the workflow may be changed by changing the sentence displayed in the sentence display field 31.

The exemplary embodiments of the present disclosure have been described above. It should be noted that exemplary embodiments of the present disclosure are not limited to the exemplary embodiments described above, but various modifications and implementations may be made without changing the gist of the present disclosure.

Each of the units 110 to 119 of the controller 11 may be implemented by a hardware circuit such as a reconfigurable circuit (field programmable gate array (FPGA)) or an application specific integrated circuit (ASIC).

Further, a portion of the constituent elements of the exemplary embodiments may be changed or modified without changing the gist of the present disclosure. Also, a step may be added, removed, changed, or replaced in the flow of the exemplary embodiments without changing the gist of the present disclosure. In addition, the program used in the exemplary embodiments may be recorded in a computer readable recording medium such as a CD-ROM and may be stored in an external server such as a cloud server and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program that causes a processor to:

perform a first function to receive an input of a natural sentence that describes content of a process for a process target;

perform a second function to receive an operation of arranging graphical representations on a display in accordance with the process;

switch which one of (i) the first function and (ii) the second function is enabled;

generate a series of processes in accordance with the natural sentence or an operation received by performing the first function or the second function which is enabled;

when the natural sentence received by the first function does not satisfy a predetermined criterion, perform control to display a screen for switching between the first function and the second function; and when the first function does not receive the input of the natural sentence within a predetermined time, the processor performs the control to display the screen for switching between the first function and the second function.

2. The non-transitory computer readable medium according to claim 1, wherein the processor switches which one of the first function and the second function is enabled in accordance with an operation by an operator.

3. The non-transitory computer readable medium according to claim 2, wherein the processor switches from a state in which the first function is enabled to a state in which the second function is enabled in accordance with an index indicating a state of the generated series of processes.

4. The non-transitory computer readable medium according to claim 3, wherein when the index is equal to or less than a predetermined value, the processor switches from the state in which the first function is enabled to the state in which the second function is enabled.

* * * * *